(12) United States Patent
Tsuda et al.

(10) Patent No.: US 11,275,421 B2
(45) Date of Patent: Mar. 15, 2022

(54) PRODUCTION SYSTEM

(71) Applicant: FANUC CORPORATION, Yamanashi (JP)

(72) Inventors: Taketsugu Tsuda, Yamanashi (JP); Shuntaro Toda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 367 days.

(21) Appl. No.: 16/133,971

(22) Filed: Sep. 18, 2018

(65) Prior Publication Data

US 2019/0086980 A1  Mar. 21, 2019

(30) Foreign Application Priority Data

Sep. 19, 2017  (JP) .............................. JP2017-178513

(51) Int. Cl.
*G06F 1/30* (2006.01)
*G05B 19/042* (2006.01)
(Continued)

(52) U.S. Cl.
CPC ........... *G06F 1/30* (2013.01); *G05B 19/0426* (2013.01); *G05B 23/0254* (2013.01); *G06F 1/28* (2013.01); *G06N 20/00* (2019.01); *G06F 9/542* (2013.01)

(58) Field of Classification Search
CPC ... G06F 1/28; G06F 1/30; G06F 9/542; G05B 19/0426; G05B 23/0254; G06N 20/00
See application file for complete search history.

(56) References Cited

U.S. PATENT DOCUMENTS 4,170,751 A    10/1979  Stricker
5,777,450 A *   7/1998  Kono ................... G05B 19/406
                                                318/568.11
(Continued)

FOREIGN PATENT DOCUMENTS

CN    203622107 U  *  6/2014
JP    S54-120651 A     9/1979
(Continued)

OTHER PUBLICATIONS

U.S. Appl. No. 62/523,732—Provisional for 2018/0116070, Jun. 2017. (Year: 2017).*
(Continued)

*Primary Examiner* — Kamran Afshar
*Assistant Examiner* — Marshall L Werner
(74) *Attorney, Agent, or Firm* — Hauptman Ham, LLP

(57) ABSTRACT

A predicting device of a production system includes a machine learning device that learns the relationship between a change in measurement data indicating the state of a power supply and a failure which occurs in the power supply. The machine learning device learns the measurement data including at least a measurement value of electric power consumption in a factory by correlating a state variable indicating the current state of an environment with judgment data indicating a failure notification indicating the occurrence of a failure. A control device of the production system includes a receiving section that receives a prediction notification of a failure which occurs in the power supply, the failure being predicted based on a change in the measurement data indicating the state of the power supply, and a retracting operation control section that makes a working machine transition to a safely retracted state when receiving the prediction notification.

17 Claims, 8 Drawing Sheets

(51) Int. Cl.
*G06F 1/28* (2006.01)
*G06N 20/00* (2019.01)
*G05B 23/02* (2006.01)
*G06F 9/54* (2006.01)

(56) References Cited

U.S. PATENT DOCUMENTS

| | | | | |
|---|---|---|---|---|
| 2004/0080858 | A1* | 4/2004 | Suzuki | G11B 21/22 360/75 |
| 2011/0231169 | A1* | 9/2011 | Furem | E02F 9/267 703/2 |
| 2014/0032169 | A1 | 1/2014 | Mccarthy et al. | |
| 2015/0137726 | A1* | 5/2015 | Tang | G05B 19/4061 318/563 |
| 2015/0273626 | A1 | 10/2015 | Tokito | |
| 2016/0041575 | A1* | 2/2016 | Tadano | G11B 21/22 360/75 |
| 2017/0033726 | A1* | 2/2017 | Yamamoto | G06N 20/00 |
| 2018/0031618 | A1* | 2/2018 | Friedlander | G06N 20/00 |
| 2018/0116070 | A1* | 4/2018 | Broadbent | H02J 4/00 |

FOREIGN PATENT DOCUMENTS

| | | | |
|---|---|---|---|
| JP | H2-162404 A | 6/1990 | |
| JP | H7-28572 A | 1/1995 | |
| JP | 2008204365 A | * 9/2008 | |
| JP | 2011021827 A | 2/2011 | |
| JP | 2015-182117 A | 10/2015 | |
| JP | 2015-529895 A | 10/2015 | |
| JP | 5964488 B1 | * 8/2016 | G06N 3/006 |

OTHER PUBLICATIONS

U.S. Appl. No. 62/550,009—Provisional for 2018/0116070, Aug. 2017. (Year: 2017).*
JP-2008204365-A Translated Document (Google Translate). (Year: 2008).*
JP-5964488-B1 Translated Document (Google Translate) (Year: 2016).*
CN-203622107-U Translated Document (Google Patents) (Year: 2014).*
Office Action in JP Application No. 2017-178513, dated Aug. 20, 2019, 4pp.

* cited by examiner

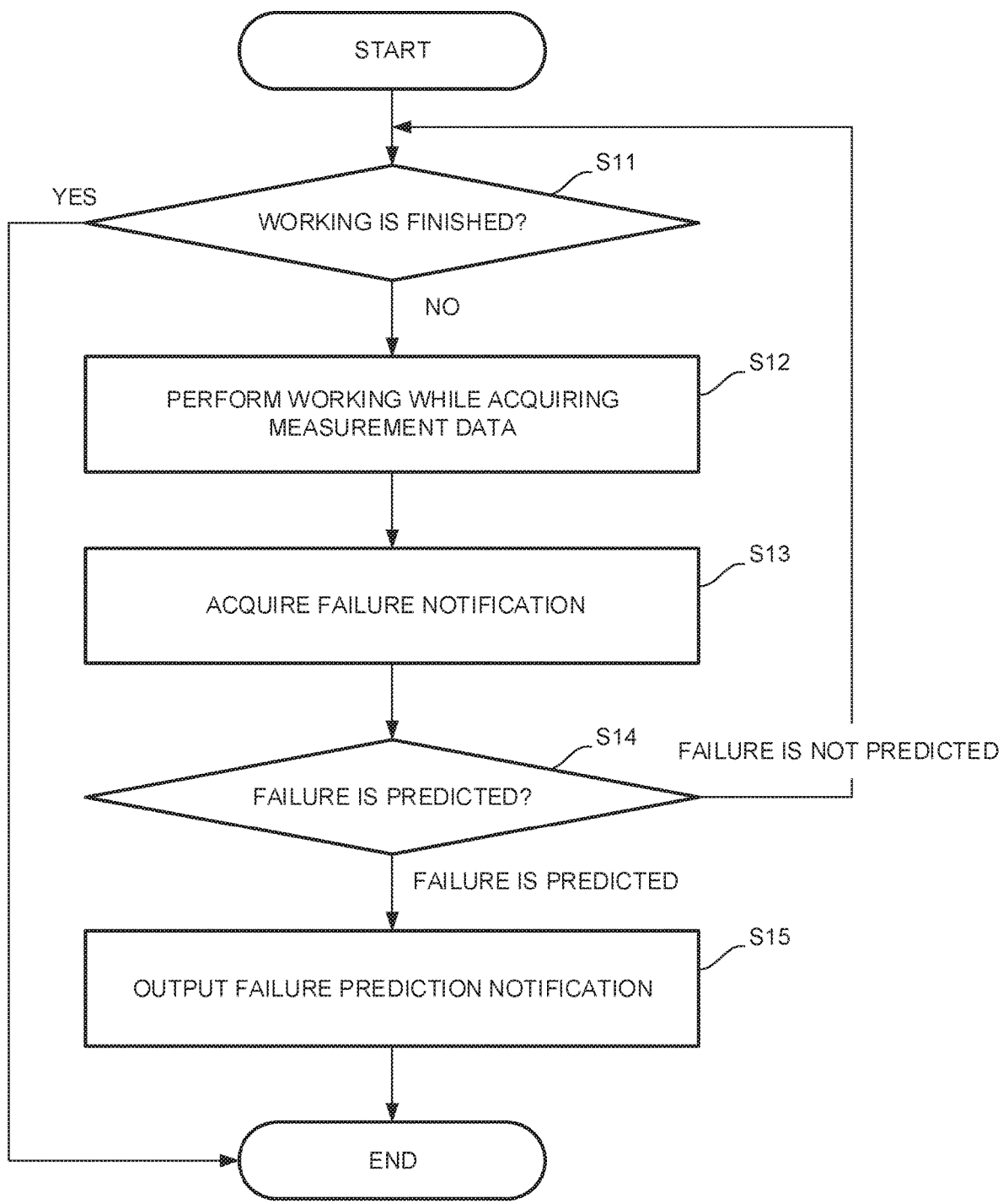

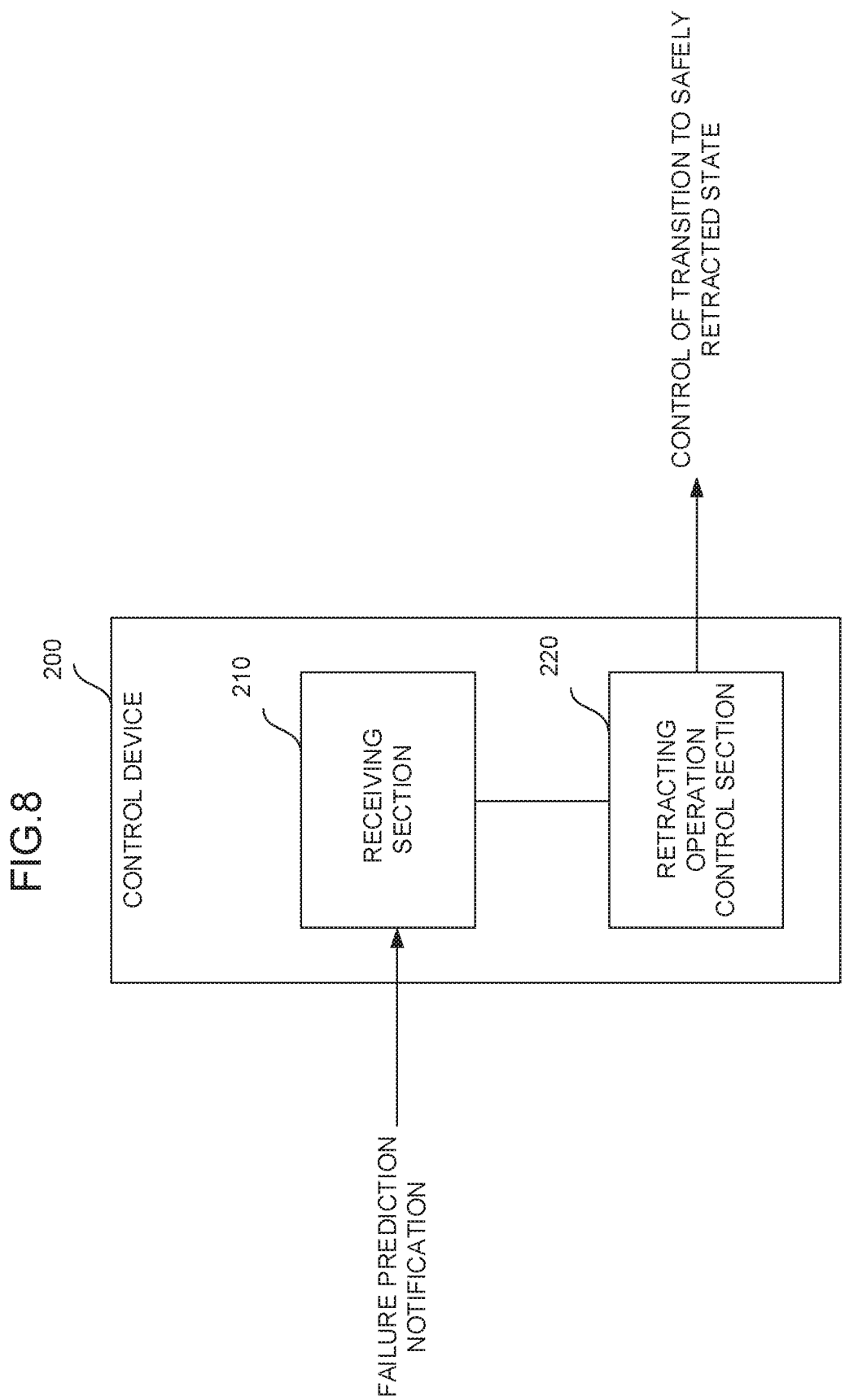

PRODUCTION SYSTEM

RELATED APPLICATIONS

The present application claims priority of Japanese Patent Application No. 2017-178513, filed on Sep. 19, 2017, the disclosure of which is hereby incorporated by reference herein in its entirety.

BACKGROUND OF THE INVENTION

1. Field of the Invention

The present invention relates to production systems and, in particular, relates to a production system that can act to avoid a problem by predicting that a power supply will become unstable.

2. Description of the Related Art

In a place or region where power conditions are unstable, a production system is sometimes powered off without a normal procedure due to a sudden voltage drop, an instantaneous power failure, or the like. This can cause various problems in the production system. For example, trouble occurs in recovery, a machine breaks down or is damaged, a workpiece in process becomes defective, or a robot drops an article which the robot is grasping.

As a prior art technique that has addressed such problems, there is Japanese Patent Application Laid-Open No. 07-028572. Japanese Patent Application Laid-Open No. 07-028572 describes a technique for protecting data from destruction by making an uninterruptible power supply system output an interrupt signal to a CPU when sensing an interruption of input of power to make the CPU save data in storage in case of a power failure (a shutdown of the uninterruptible power supply system).

However, the technique described in Japanese Patent Application Laid-Open No. 07-028572 requires the uninterruptible power supply system as an indispensable component element and cannot be applied to an environment without the uninterruptible power supply system. For instance, if there are many machine tools, robots, and so forth present in a factory, all the machine tools, robots, and so forth have to be backed up by the uninterruptible power supply system, which involves enormous cost. Moreover, the description of Japanese Patent Application Laid-Open No. 07-028572 does not present specific measures to avoid problems which will arise when power becomes unstable in a production system including machine tools, robots, and so forth.

SUMMARY OF THE INVENTION

The present invention has been made to solve such problems and an object thereof is accordingly to provide a production system that can act to avoid a problem by predicting that power will become unstable.

A predicting device according to an embodiment of the present invention is a predicting device that predicts that power will become unstable and includes a machine learning device that learns the relationship between a change in measurement data indicating the state of a power supply and a failure which occurs in the power supply. The machine learning device includes: a state observing section that observes the measurement data including at least a measurement value of electric power consumption in a factory as a state variable indicating the current state of an environment; a judgment data acquiring section that acquires, as judgment data, a failure notification indicating the occurrence of the failure; and a learning section that learns a change in the measurement data and the failure notification by correlating a change in the measurement data with the failure notification by using the state variable and the judgment data.

In the predicting device according to the embodiment of the present invention, the learning section calculates the state variable and the judgment data in a multi-layer structure.

The predicting device according to the embodiment of the present invention further includes a judgment outputting section that predicts the occurrence of the failure in accordance with the measurement data based on a learning result by the learning section and, if the failure is predicted to occur, outputs a failure prediction notification.

In the predicting device according to the embodiment of the present invention, the machine learning device is placed in cloud, fog, and edge computing environments.

A machine learning device according to the embodiment of the present invention is a machine learning device that learns the relationship between a change in measurement data indicating the state of a power supply and a failure which occurs in the power supply. The machine learning device includes: a state observing section that observes the measurement data including at least a measurement value of electric power consumption in a factory as a state variable indicating the current state of an environment; a judgment data acquiring section that acquires, as judgment data, a failure notification indicating the occurrence of the failure; and a learning section that learns a change in the measurement data and the failure notification by correlating a change in the measurement data with the failure notification by using the state variable and the judgment data.

A control device according to the embodiment of the present invention is a control device that controls a working machine. The control device includes: a receiving section that receives a prediction notification of a failure which occurs in a power supply the failure being predicted based on a change in measurement data indicating the state of the power supply; and a retracting operation control section that makes the working machine transition to a safely retracted state when receiving the prediction notification.

In the control device according to the embodiment of the present invention, transition to the safely retracted state includes moving the position or location of the working machine to a predetermined location and interrupting a working operation, which is being executed, after executing the working operation until a predetermined stage.

A production system according to the embodiment of the present invention is a production system that includes a predicting device which predicts that power will become unstable and a control device which controls a working machine. The predicting device includes a machine learning device that learns the relationship between a change in measurement data indicating the state of a power supply and a failure which occurs in the power supply. The machine learning device includes: a state observing section that observes the measurement data including at least a measurement value of electric power consumption in a factory as a state variable indicating the current state of an environment; a judgment data acquiring section that acquires, as judgment data, a failure notification indicating the occurrence of the failure; and a learning section that learns a change in the measurement data and the failure notification by correlating a change in the measurement data with the failure notification by using the state variable and the judgment data. The control device includes: a receiving section that receives a prediction notification of a failure which occurs in the power supply, the failure being predicted based on a change in the measurement data indicating the state of the power supply; and a retracting operation control section that makes the working machine transition to a safely retracted state when receiving the prediction notification.

According to the present invention, it is possible to provide a production system that can act to avoid a problem by predicting that power will become unstable.

BRIEF DESCRIPTION OF THE DRAWINGS

These and other objects and features of the present invention will become apparent from the following description of exemplary embodiments with reference to the accompanying drawings in which:

FIG. 7 is a flowchart of an operation of the predicting device; and

FIG. 8 is a block diagram depicting the schematic configuration of a control device.

DETAILED DESCRIPTION OF THE PREFERRED EMBODIMENTS

Embodiments of the present invention will be described by using the drawings.

A production system according to the embodiments of the present invention includes a predicting device 100 that predicts that power will become unstable and one or more control devices 200 that control working machines such as various machine tools and robots. When the predicting device 100 predicts that power will become unstable, the control devices 200 control the machine tools, the robots, and so forth so as to perform operations to avoid a failure caused thereby. The one or more control devices 200 are placed in a factory, and the control devices 200 control the various machine tools, the robots, and so forth. The control devices 200 are typically controlled by a programmable logic controller (PLC) in a concentrated manner. Typically, the predicting device 100 in the embodiments is connected to this PLC in such a way that the predicting device 100 can communicate with the PLC. Alternatively, the predicting device 100 can be implemented as a function of the PLC. This allows the predicting device 100 to communicate with the control devices 200 via the PLC and control the control devices 200. Alternatively, the predicting device 100 may be placed in cloud computing, fog computing, and edge computing environments, for example, in which the predicting device 100 can communicate with the control devices 200.

<Configuration and Operation of the Predicting Device 100>

The predicting device 100 collects information on, for example, electric power consumption and a voltage change in the factory and information on the occurrence of a power failure, a voltage drop, and so forth and models the relationship between these information by machine learning (a learning process). Moreover, the predicting device 100 predicts the occurrence of a power failure, a voltage drop, and so forth by observing, for example, electric power consumption and a voltage change in the factory by using the model created by the learning process (a prediction process).

Figure 1:
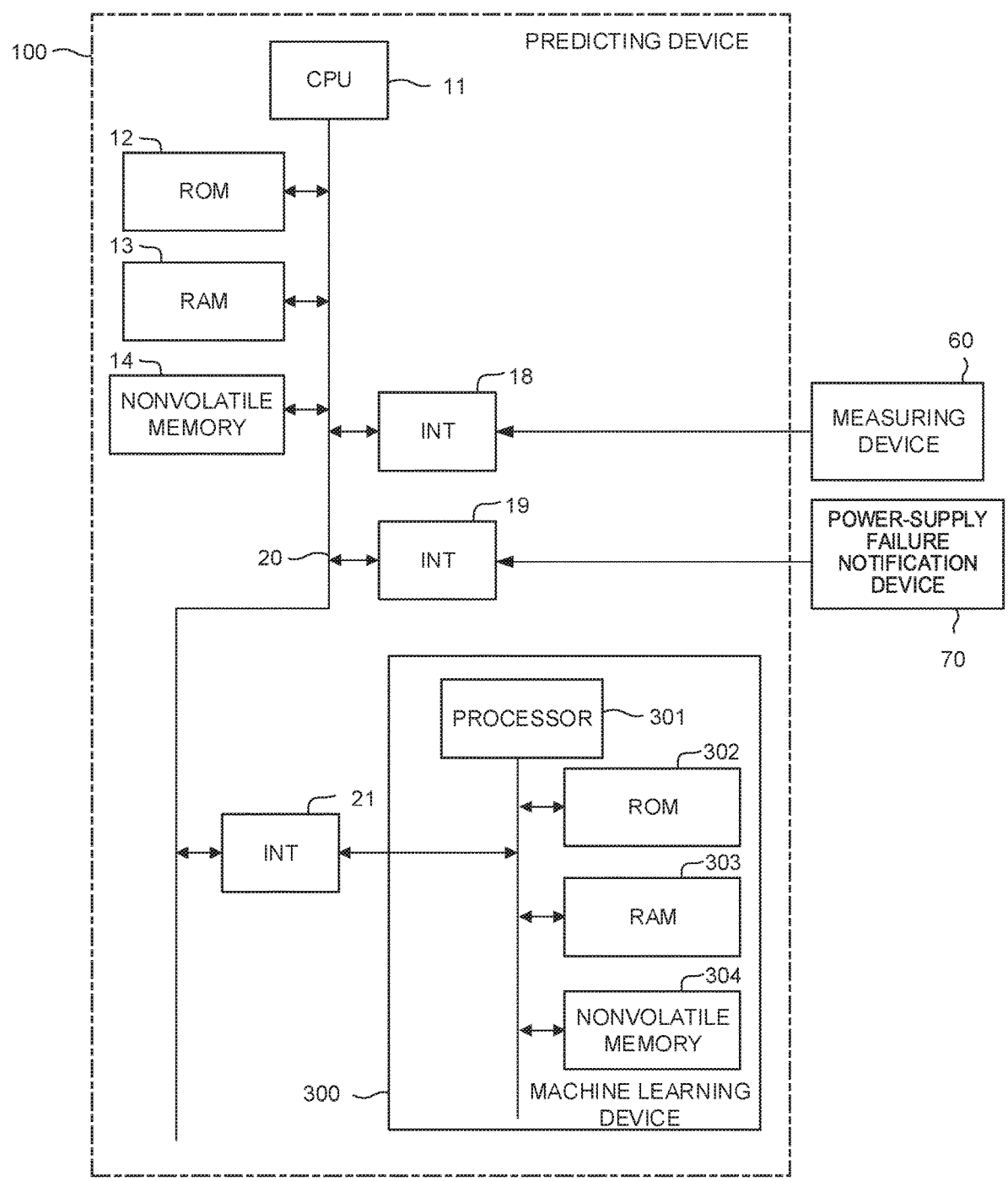
FIG. 1 is a block diagram depicting a schematic hardware configuration showing principal portions of a predicting device.

FIG. 1 is a schematic hardware configuration diagram depicting principal portions of the predicting device 100. A CPU 11 is a processor that performs overall control of the predicting device 100. The CPU 11 reads a system program stored in ROM 12 via a bus 20 and controls the whole of the predicting device 100 in accordance with the system program. In RAM 13, temporary calculation data and display data and various data input from the outside are temporarily stored.

A nonvolatile memory 14 is configured as a memory whose storage state is retained by being backed up by an unillustrated battery for example, even when the power supply of the predicting device 100 is turned off. In the memory various programs and data input via an unillustrated interface are stored. The programs and data stored in the nonvolatile memory 14 may be expanded into the LAM 13 when the programs and data are executed/used. Moreover, in the ROM 12, various system programs are written in advance.

A measuring device 60 measures electric power consumption in the factory at predetermined time intervals and outputs the results. In addition, the measuring device 60 may measure the voltage of the factory electric power consumption in a region, and a time (a time period) and output the results. The electric power consumption and voltage in the factory can be acquired by a sensor or the like installed in a switchboard of the factory. As the electric power consumption in the region, electric power consumption provided by an electric power substation or the like which holds jurisdiction over the region where the factory is located can be acquired. The measuring device 60 conducts sampling of these measurement data at predetermined time intervals (preferably, in units of seconds; however, this can be appropriately adjusted in accordance with power supply conditions or the like) and transmits the measurement data to the predicting device 100. The predicting device 100 receives the measurement data from the measuring device 60 via an interface 18 and passes the measurement data to the CPU 11.

A power-supply failure notification device 70 generates information on a failure of the power supply. The power-supply failure notification device 70 monitors the voltage by the sensor or the like installed in the switchboard of the factory for example, and, if the voltage drops below a predetermined threshold value, outputs a notification signal (hereinafter, a failure notification) providing a notification of a failure. The predicting device 100 receives the notification from the power-supply failure notification device 70 via an interface 19 and passes the notification to the CPU 11.

An interface 21 is an interface for connecting the predicting device 100 and a machine learning device 300. The machine learning device 300 includes a processor 301 that controls the whole of the machine learning device 300, ROM 302 that stores a system program and so forth, RAM 303 for performing temporary storage in each processing related to machine learning, and a nonvolatile memory 304 that is used to store a learning model and so forth. The machine learning device 300 can observe the information (the measurement data, the failure notification, and so forth) acquired by the predicting device 100 via the interface 21.

Figure 2:
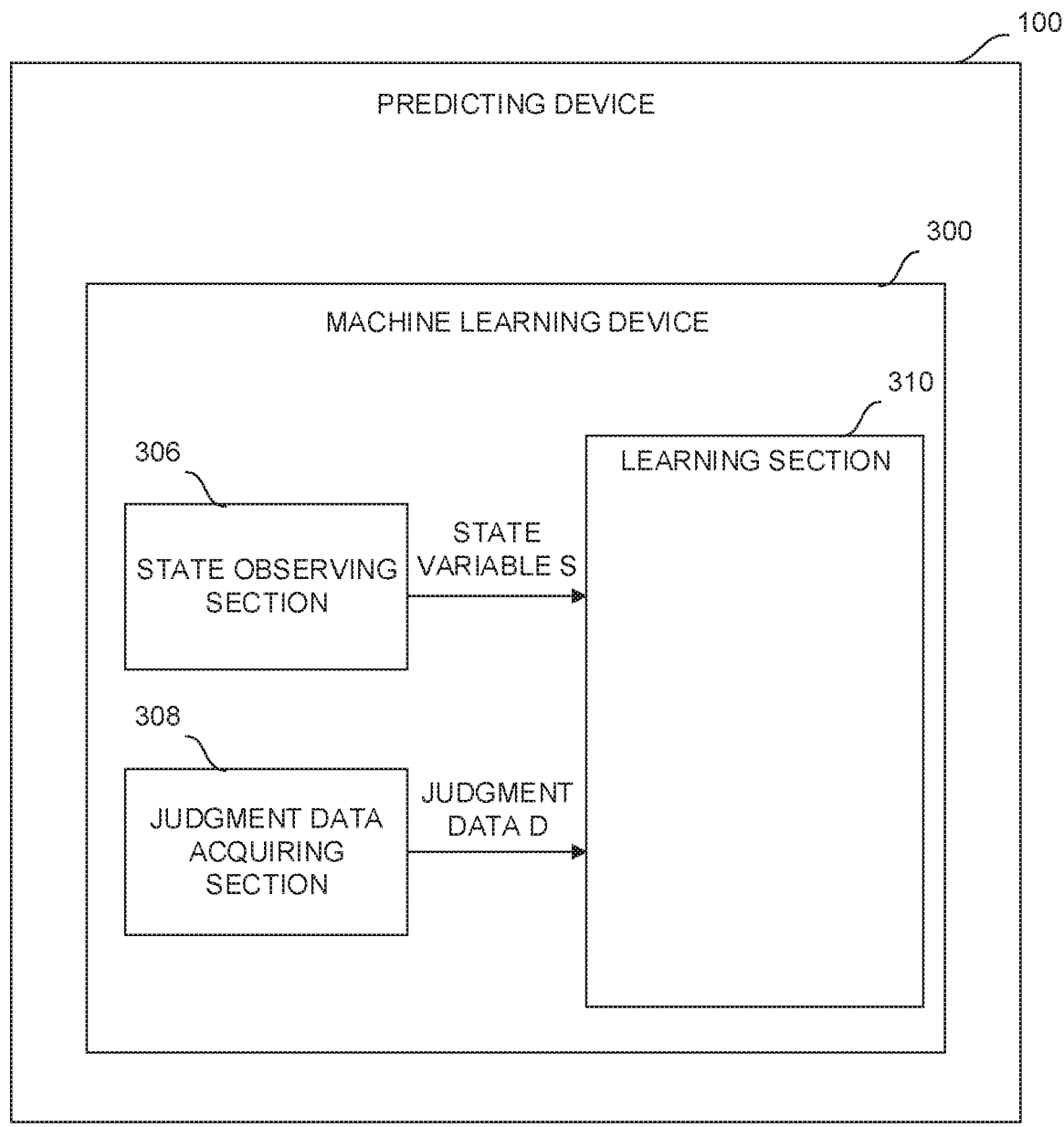
FIG. 2 is a block diagram depicting the schematic configuration of the predicting device and a machine learning device according to a first embodiment.

FIG. 2 is a schematic functional block diagram of the predicting device 100 and the machine learning device 300 according to a first embodiment. The machine learning device 300 includes software (such as a learning algorithm) and hardware (such as the processor 301) for learning for itself the correlative relationship between a change in the measurement data and the failure notification by so-called machine learning. The machine learning device 300 of the predicting device 100 learns a model structure indicating a correlation between a change in the measurement data and the failure notification.

As depicted in FIG. 2 as functional blocks, the machine learning device 300 of the predicting device 100 includes: a state observing section 306 that observes the time-series measurement data as a state variable S indicating the current state of an environment; a judgment data acquiring section 308 that acquires the failure notification as judgment data D; and a learning section 310 that learns the relationship between a change in the measurement data and the failure notification by using the state variable S and the judgment data D. The state observing section 306 can be configured as, for instance, a function of the processor 301. Alternatively the state observing section 306 can be configured as, for instance, software, which is stored in the ROM 302, for making the processor 301 function. As the state variable S which is observed by the state observing section 306, that is, the time-series measurement data, the measurement data output from the measuring device 60 can be acquired. The measuring device 60 extracts, from the time-series measurement data acquired with a predetermined sampling period, the time-series measurement data acquired for a predetermined time and outputs the extracted time-series measurement data to the state observing section 306 as the state variable S. For instance, the measuring device 60 acquires the measurement data at all times and saves the measurement data during a predetermined fixed period (for example, in the past ten minutes from the time at which the latest measurement data is acquired). The measuring device 60 senses that the power-supply failure notification device 70 has output the failure notification and outputs, as the state variable S, the time-series measurement data during a past predetermined fixed period from a point of time at which the failure notification was provided (for example, during the past n minutes from the point of time at which a failure occurred or the past n minutes from the time m minutes before the occurrence of a failure). Depending on the period during which the measurement data adopted as the state variable S is output, it is possible to make a short-term (in units of seconds or minutes), medium-term (in units of a few hours), or long-term (in units of days) prediction of a power-supply failure. Moreover, it is also possible to predict a time that elapses before the occurrence of a power-supply failure. For instance, by creating a learning model by using the measurement data during the past n minutes from the time m minutes before the occurrence of a failure, this learning model can predict a possibility that a power-supply failure occurs in m minutes. If the measuring device 60 acquires a plurality of pieces of measurement data. S1, S2, S3, . . . , the set of these plurality of pieces of time-series measurement data is output as the state variable S.

The judgment data acquiring section 308 can be configured as, for instance, a function of the processor 301. Alternatively the judgment data acquiring section 308 can be configured as, for instance, software, which is stored in the ROM 302, for making the processor 301 function. As the judgment data D which is observed by the judgment data acquiring section 308, that is, the failure notification, the output of the power-supply failure notification device 70 can be acquired.

The learning section 310 can be configured as, for instance, a function of the processor 301. Alternatively the learning section 310 can be configured as, for instance, software, which is stored in the ROM 302, for making the processor 301 function. The learning section 310 learns the correlative relationship between a change in the measurement data and the failure notification in accordance with an arbitrary learning algorithm which is generically called machine learning. The learning section 310 can repeatedly execute learning based on a data set including the above-described state variable S and judgment data D.

By repeating such a learning cycle, the learning section 310 can automatically identify features that imply a correlation between a change in the measurement data and the failure notification. At the start of the learning algorithm, a correlation between a change in the measurement data and the failure notification is substantially unknown; however, the learning section 310 gradually identifies features with the progress of learning and interprets a correlation. When a correlation between a change in the measurement data and the failure notification is interpreted to a level which is reliable to some extent, the learning result which is repeatedly output from the learning section 310 can be used to estimate a failure notification which can be provided for the current state (a trend in a change in the measurement data). That is, the learning section 310 can bring a correlation between a change in the measurement data and the failure notification gradually closer to an optimum solution with the progress of the learning algorithm.

As described above, in the machine learning device 300 of the predicting device 100, the learning section. 310 learns the failure notification in accordance with the machine learning algorithm by using the state variable S observed by the state observing section 306 and the judgment data D acquired by the judgment data acquiring section 308. The state variable S is configured with data that is not easily affected by a disturbance, and the judgment data D is uniquely determined. Thus, with the machine learning device 300 of the predicting device 100, by using the learning result of the learning section 310, it is possible to provide the failure notification corresponding to a change in the measurement data automatically and accurately without the help of calculation or estimate.

Figure 3:
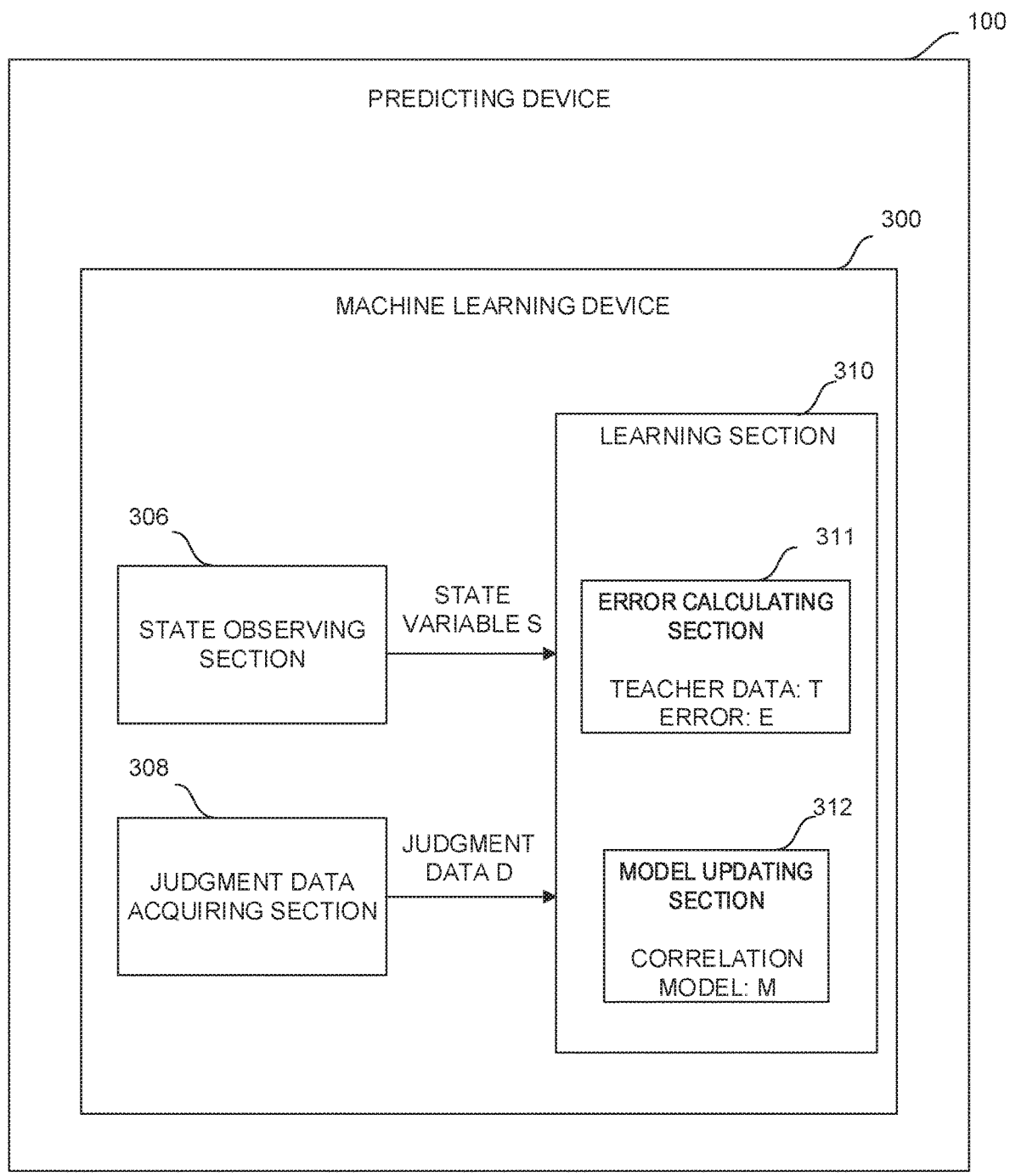
FIG. 3 is a block diagram depicting a schematic configuration in which a learning section of the predicting device learns the correlative relationship between a change in measurement data and a failure notification.

In the machine learning device 300 having the above-described configuration, the learning algorithm which is executed by the learning section 310 is not limited to a particular learning algorithm, and a publicly known learning algorithm can be adopted as machine learning. FIG. 3 depicts a configuration, which is a mode of the predicting device 100 depicted in FIG. 2, including the learning section 310 that executes supervised learning as an example of the learning algorithm. Supervised learning is a technique of learning a correlation model for estimating a necessary output (the failure notification for a change in the measurement data) for a new input by being provided with a large quantity of known data sets of inputs and corresponding outputs (which will be referred to as teacher data) and identifying features that imply a correlation between an input and an output from these teacher data.

In the machine learning device 300 of the predicting device 100 depicted in FIG. 3, the learning section 310 includes an error calculating section 311 that calculates an error E between a correlation model M which derives the failure notification from the state variable S and a correlation feature which is identified from prepared teacher data T and a model updating section 312 that updates the correlation model M so as to reduce the error E. The learning section 310 learns the correlative relationship between a change in the measurement data and the failure notification as a result of the model updating section 312 repeating update of the correlation model M.

The correlation model M can be constructed by regression analysis, reinforcement learning, deep learning, or the like. An initial value of the correlation model M is provided to the learning section 310 before the start of supervised learning as a simplified expression of a correlation between the state variable S and shape data, for example. The teacher data T can be configured with, for example, empirical values (known data sets of changes in the measurement data and the failure notifications) accumulated by recording the past correspondence between a change in the measurement data and the failure notification and is provided to the learning section 310 before the start of supervised learning. The error calculating section 311 identifies a correlation feature that implies a correlation between a change in the measurement data and the failure notification from a large quantity of teacher data T provided to the learning section 310 and determines the error E between this correlation feature and the correlation model M corresponding to the state variable S in the current state. The model updating section 312 updates the correlation model M so as to reduce the error E in accordance with a predetermined update rule, for example.

In a next learning cycle, by using the newly obtained state variable S and judgment data D, the error calculating section 311 determines the error E for the correlation model M corresponding to these state variable S and judgment data D, and the model updating section 312 updates the correlation model M again. In this way a correlation, which was unknown, between the current state of the environment (a change in the measurement data) and the state corresponding thereto (the failure notification) becomes gradually clear. That is, the relationship between a change in the measurement data and the failure notification is gradually brought closer to an optimum solution by update of the correlation model M.

Figure 4A:
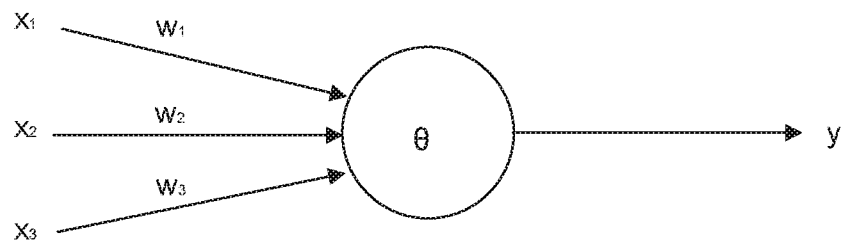
FIG. 4A is a diagram explaining a neuron.
Figure 4B:
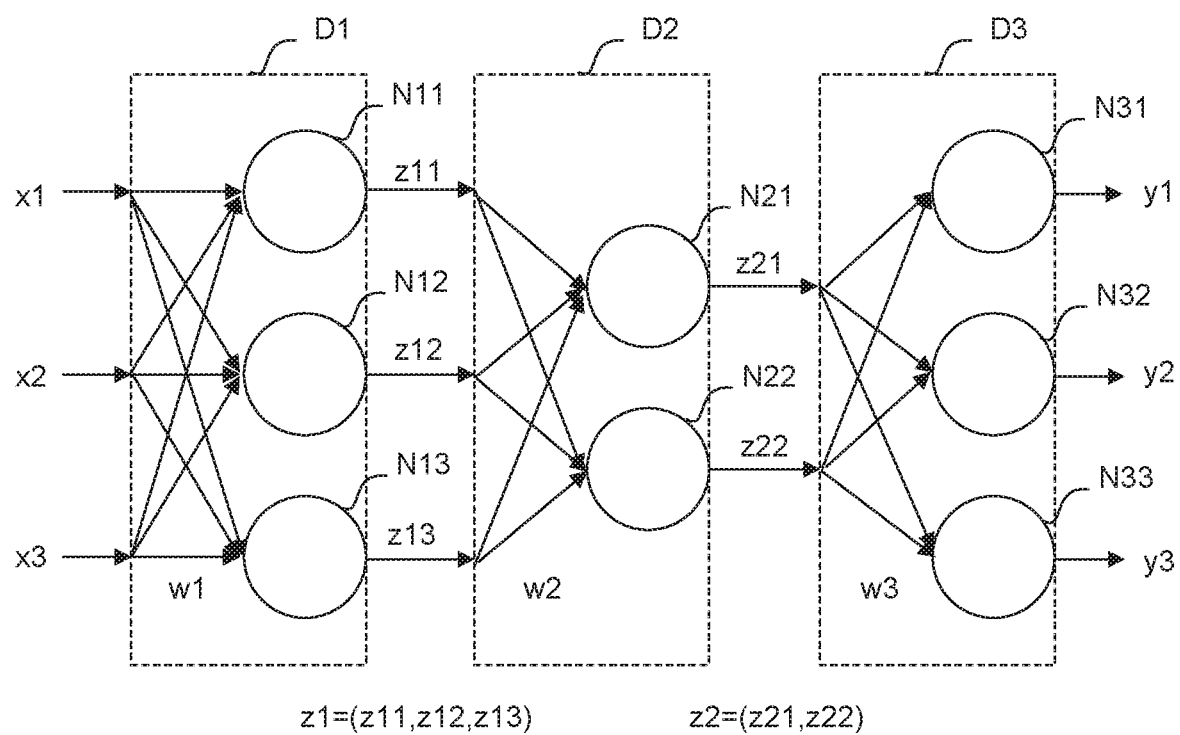
FIG. 4B is a diagram explaining a neural network.

When the above-described supervised learning is advanced, a neural network can be used, for example. FIG. 4A schematically depicts a model of a neuron. FIG. 4B schematically depicts a model of a three-layer neural network (including three layers D1, D2, and D3) configured by combining the neurons depicted in FIG. 4A. The neural network can be configured by, for example, a calculation device, storage, or the like which imitates the model of the neuron.

The neuron depicted in FIG. 4A outputs a result y of a plurality of inputs x (here, for example, inputs $x_1$ to $x_3$). The inputs $x_1$ to $x_3$ are multiplied by weights w ($w_1$ to $w_3$) corresponding to these inputs x. As a result, the neuron outputs an output y expressed by Formula 1 given below. In Formula 1, all of the input x, the output y, and the weight w are vectors. Moreover, θ is a bias and $f_k$ is an activating function.

$$y = f_k(\Sigma_{i=1}^n x_i w_i - \theta) \quad \text{[Formula 1]}$$

A plurality of inputs x (here, for example, inputs x1 to x3) are input to the three-layer neural network depicted in FIG. 4B from the left side thereof, and results y (here, for example, results y1 to y3) are output from the right side thereof. In an example depicted in the drawing, each of the inputs x1, x2, and x3 is multiplied by a corresponding weight (generically expressed as w1) and each of the inputs x1, x2, and x3 is input to three neurons N11, N12, and N13.

In FIG. 4B, the outputs of the neurons N11 to N13 are generically expressed as z1. z1 can be regarded as a feature vector which is the extracted feature amount of an input vector. In the example depicted in the drawing, each of the feature vectors z1 is multiplied by a corresponding weight (generically expressed as w2), and each of the feature vectors z1 is input to two neurons N21 and N22. The feature vector z1 indicates a feature between the weight w1 and the weight w2.

In FIG. 4B, the outputs of the neurons N21 and N22 are generically expressed as z2. z2 can be regarded as a feature vector which is the extracted feature amount of the feature vector z1. In the example depicted in the drawing, each of the feature vectors z2 is multiplied by a corresponding weight (generically expressed as w3), and each of the feature vectors z2 is input to three neurons N31, N32, and N33. The feature vector z2 indicates a feature between the weight w2 and the weight w3. Finally the neurons N31 to N33 respectively output the results y1 to y3.

In the machine learning device 300 of the predicting device 100, as a result of the learning section 310 performing calculation of a multi-layer structure in accordance with the above-described neural network by using the state variable S as the input x, the failure notification can be output as an estimated value (the result y). Operation modes of the neural network include a learning mode and a judgment mode; for example, learning of a weight W can be performed in the learning mode by using a learning data set and a judgment of the shape data can be made in the judgment mode by using the learned weight W. In the judgment mode, detection, classification, inference, and so forth can also be performed.

The above-described configuration of the predicting device 100 and the machine learning device 300 can be described as a machine learning method (or software) which is executed by the CPU 11 or the processor 301. This machine learning method is a machine learning method of learning the failure notification corresponding to a change in the measurement data and includes a step in which the CPU 11 or the processor 301 observes a change in the measurement data as the state variable S indicating the current state of the environment, a step in which the CPU 11 or the processor 301 acquires the failure notification as the judgment data D, and a step in which the CPU 11 or the processor 301 learns a change in the measurement data and the failure notification by correlating a change in the measurement data with the failure notification by using the state variable S and the judgment data D.

According to the present embodiment, the machine learning device 300 generates a model indicating a correlation between a change in the measurement data and the failure notification. As a result, once the learning model is created, even in the middle of working, it is possible to predict the failure notification based on a change in the measurement data which can be acquired by that point of time.

Figure 5:
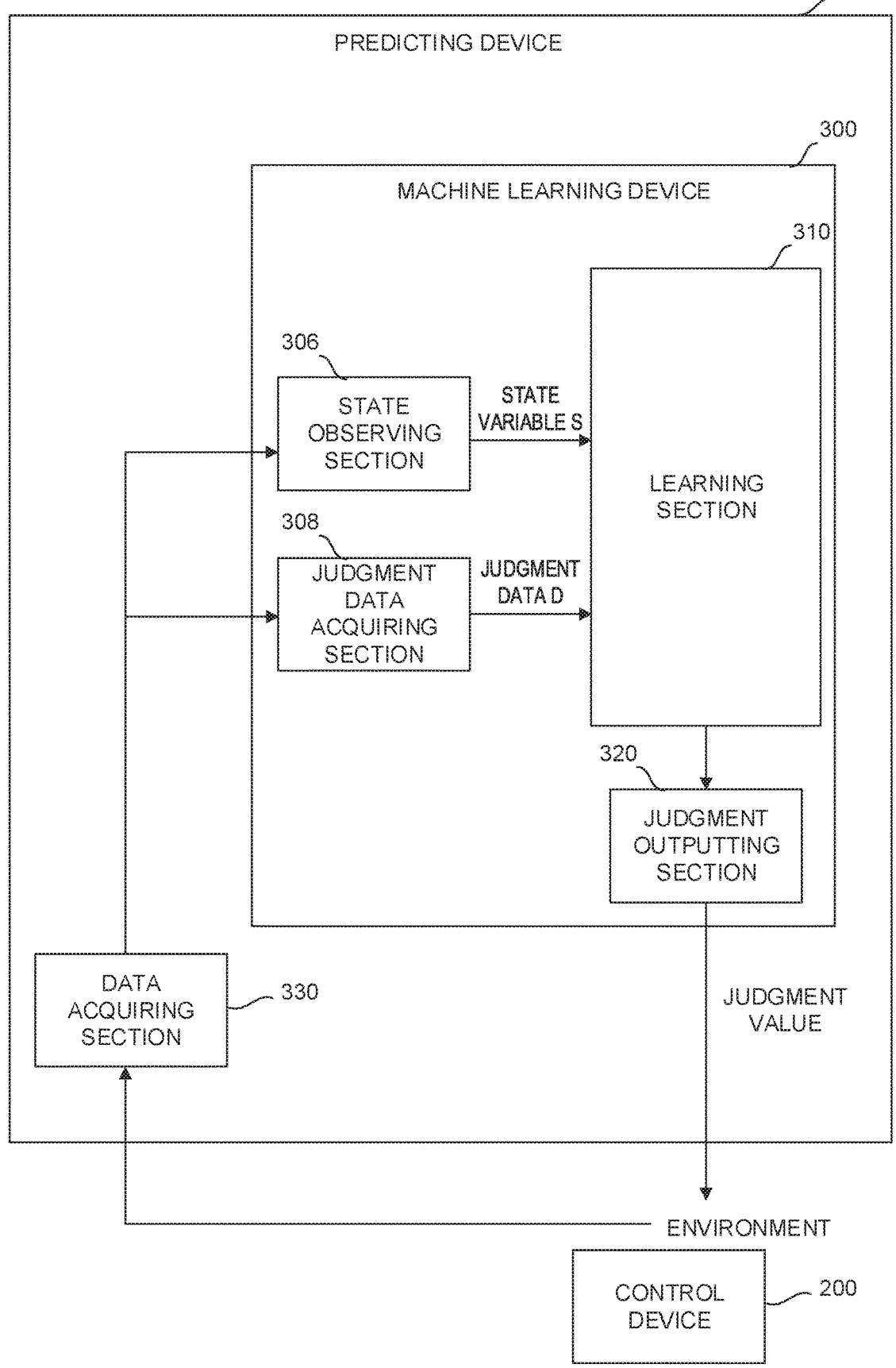
FIG. 5 is a block diagram depicting the schematic configuration of a predicting device and a machine learning device according to a second embodiment.

FIG. 5 depicts a predicting device 100 according to a second embodiment. The predicting device 100 includes a machine learning device 300 and a data acquiring section 330. The data acquiring section 330 acquires the time-series measurement data and the failure notification from the measuring device 60 and the power-supply failure notification device 70.

The machine learning device 300 of the predicting device 100 includes, in addition to the configuration of the machine learning device 300 of the first embodiment, a judgment outputting section 320 that outputs, to the control device 200, the failure notification estimated by the learning section 310 based on a change in the measurement data.

The judgment outputting section 320 can be configured as, for instance, a function of the processor 301. Alternatively the judgment outputting section 320 can be configured as, for instance, software for making the processor 301 function. The judgment outputting section 320 outputs, to the control device 200, the failure notification estimated by the learning section 310 based on a change in the measurement data.

The machine learning device 300 of the predicting device 100 having the above-described configuration produces the same effect as that of the above-described machine learning device 300. In particular, the machine learning device 300 according to the second embodiment can change the state of the environment by an output of the judgment outputting section 320. On the other hand, the machine learning device 300 of the first embodiment can make an external device perform a function corresponding to the judgment outputting section 320 for reflecting the learning result of the learning section 310 in the environment.

Next, as an embodiment of the predicting device 100, processing will be described which is performed by the predicting device 100, that is, generating a learning model of the correlative relationship between a change in the measurement data and the failure notification (the learning process) and predicting that the power supply will become unstable by using the learning model (the prediction process).

Figure 6:
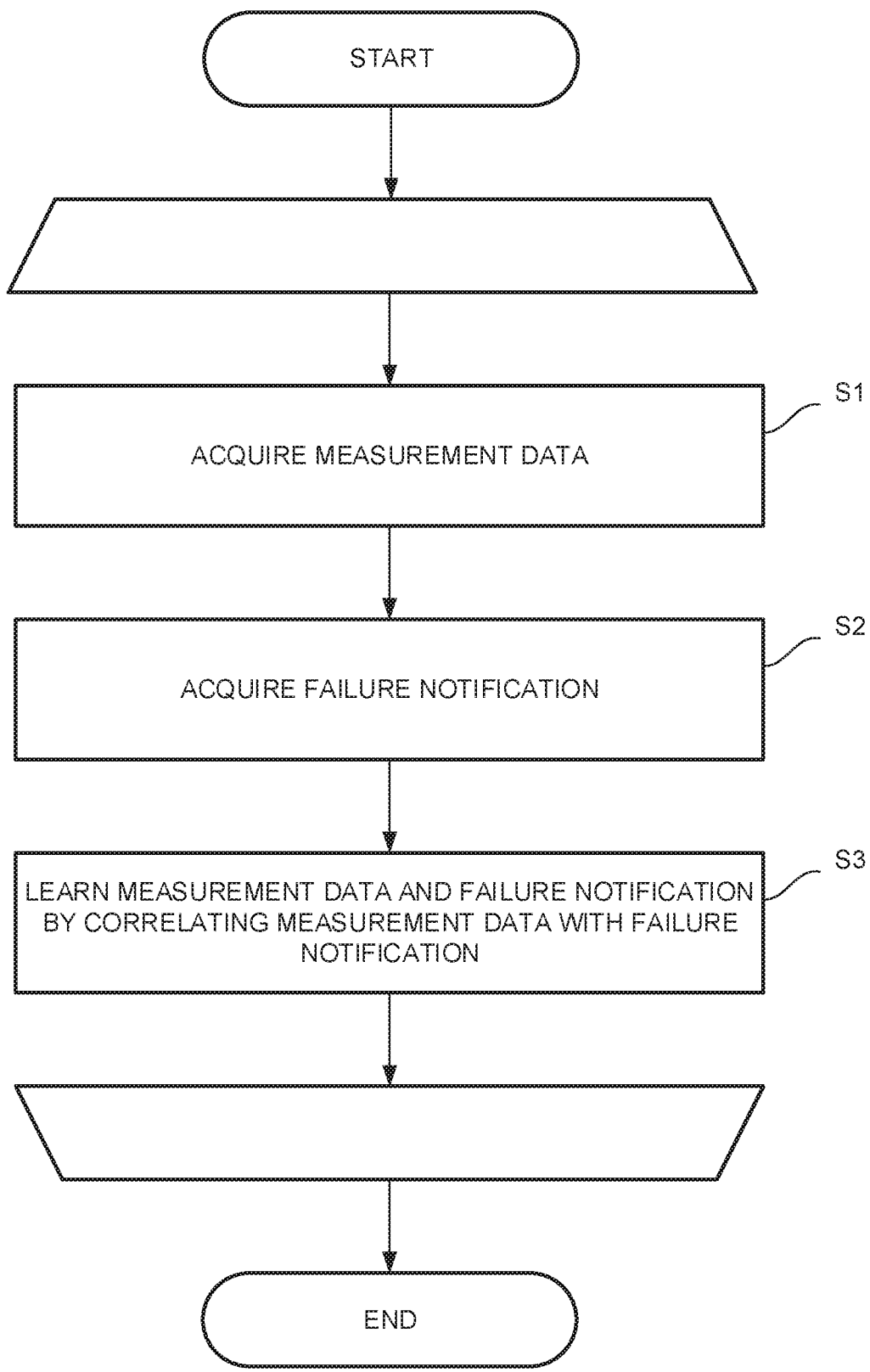
FIG. 6 is a flowchart of an operation of the predicting device.

By using a flowchart of FIG. 6, an operation of the predicting device 100 in the learning process will be described.

S1: The various machine tools, robots, and so forth start working under control of the control device 200. At the start of working, the predicting device 100 starts collecting the measurement data from the measuring device 60. The predicting device 100 acquires the measurement data with a predetermined sampling period for a predetermined time and stores the measurement data.

S2: If the power supply is interrupted or a voltage drops below a threshold value during working, the predicting device 100 receives the failure notification from the power-supply failure notification device 70.

S3: The predicting device 100 inputs, as the state variable S, the time-series data of the measurement data acquired in Step S1 and, as the judgment data 1D, the failure notification acquired in Step S2 to the machine learning device 300, and creates a learning model indicating the correlative relationship between the state variable S and the judgment data D.

The predicting device 100 repeats the processing from Steps S1 to S3 until the predicting device 100 obtains a sufficient number of state variables S and judgment data D to obtain a learning model with a desired degree of accuracy.

In this learning process, one learning cycle (the processing from Steps S1 to S3) is performed every time the failure notification is issued.

Next, by using a flowchart of FIG. 7, an operation of the predicting device 100 in the prediction process will be described.

S11: The various machine tools, robots, and so forth start working under control of the control device 200. Then, the following processing is continuously executed until the machine tools, the robots, and the control device 200 stop operating.

S12: At the start of working, the predicting device 100 starts collecting the measurement data from the measuring device 60. The predicting device 100 acquires the measurement data with a predetermined sampling period for a predetermined time and stores the measurement data.

S13: The predicting device 100 inputs, as the state variable S, the time-series measurement data acquired in Step S12 to the machine learning device 300. The machine learning device 300 inputs the state variable S to the learned model and outputs the judgment data D corresponding to the state variable S as a predicted value.

S14: If the failure notification is not output as the predicted value, the procedure goes back to Step S11 and working is continuously performed. If the failure notification is output as the predicted value, the procedure proceeds to Step S15.

S15: The predicting device 100 outputs, to the control device 200, a notification (a failure prediction notification) indicating a prediction of the occurrence of a failure.

In the present embodiment, the machine learning device 300 of the predicting device 100 generates a learning model created as a result of learning of the correlative relationship between a change in the measurement data in a fixed time after the start of working and the failure notification. By using this learning model, the predicting device 100 can predict the failure notification based on a change in the measurement data during working and notifies the control device 200 of the prediction result.

<Configuration and Operation of the Control Device 200>

When the control device 200 receives the failure prediction notification from the predicting device 100, based on a predetermined program, the control device 200 makes the machine tool, the robot, and the like execute a retracting operation to avoid a problem which can arise.

FIG. 8 is a schematic functional block diagram of the control device 200. The control device 200 includes a receiving section 210 that receives the failure prediction notification from the predicting device 100 and a retracting operation control section 220 that makes the machine tool, the robot, and the like execute the retracting operation. The control device 200 is an information processor that executes predetermined processing as a result of a CPU reading and executing various programs stored in storage, and is a numeric control device or a robot control device, for example.

The retracting operation control section 220 holds, in an unillustrated storage area in advance, an operation program for making the machine tool, the robot, and the like transition to a safely retracted state. When the receiving section 210 senses the failure prediction notification, the retracting operation control section 220 interrupts a working program or the like which is being executed and causes the operation program for transition to the safely retracted state to be executed.

Here, the safely retracted state refers to a state which the machine tool, the robot, and the like have to enter to prevent or suppress a problem which can arise when the supply of power to the machine tool, the robot, and the like is interrupted. For example, the safely retracted state can include operations such as making the machine tool, the robot, and the like stop after moving the machine tool, the robot, and the like to a predetermined location, returning a workpiece to a predetermined location, and interrupting the working of a workpiece in a predetermined stage.

Hereinafter, as an embodiment, an example of control which is performed by the control device 200 to make the machine tool, the robot, and the like transition to the safely retracted state will be described.

Example 1

An example of a retracting action which the control device 200 makes a robot loading and unloading a part and a machine tool performing working of a part execute will be described. When the receiving section 210 receives the failure prediction notification, the retracting operation control section 220 interrupts the operation of the robot if the robot is operating and moves the robot to a location where no problem will arise even if the power supply to the robot is interrupted. For example, the retracting operation control section 220 stops the operation of the robot after putting the robot in a predetermined safe position. Moreover, if the machine tool is performing working, the retracting operation control section 220 moves an axis, which may damage a workpiece if the supply of power is interrupted, to a predetermined safe location. For instance, the retracting operation control section 220 moves a tool to the uppermost or lowermost position. Furthermore, if log data, programs, user data, and so forth which are related to the working results are held in volatile storage in the control device 200, the retracting operation control section 220 saves the data in nonvolatile storage.

According to the present embodiment, upon receipt of the failure prediction notification, the retracting operation control section 220 retracts the robot, the machine tool, and the like to a safe position or place. This makes it possible to prevent a problem from arising due to an unexpected operation of the robot, the machine tool, and the like even if a sudden power interruption or the like occurs.

Example 2

Another example of the retracting action which the control device 200 makes a robot loading and unloading a part and a machine tool performing working of a part execute will be described. When the receiving section 210 receives the failure prediction notification, the retracting operation control section 220 executes an operation to minimize the effects caused by an interruption of the power supply and then stops the robot, the machine tool, and the like in a manner similar to Example 1.

For instance, if the robot is grasping a workpiece, the retracting operation control section 220 makes the robot perform an operation to return the workpiece to a predetermined place and then stops the operation. If the machine tool is performing the working of a workpiece, the retracting operation control section 220 calculates an end time of the working which is being executed and judges whether or not the working is finished by the time at which a power-supply failure is predicted to occur. If the working is finished by that time, the retracting operation control section 220 stops the operation after the working is finished. If the working cannot be finished by that time, the retracting operation control section 220 executes the working until just before a cutting edge moves away from the workpiece (for example, when a next rapid traverse instruction is started) and then stops the operation. If a wire electric discharge machine is performing working of a workpiece, the control device 200 retracts a wire to the position of the first formed hole and stops the operation. If an injection molding machine is performing a molding operation, the control device 200 purges the material in a nozzle and stops the operation.

According to this example, upon receipt of the failure prediction notification, the retracting operation control section 220 executes an operation to minimize the effects caused by an interruption of the power supply and then retracts the robot, the machine tool, and the like to a safe position or place. This makes it possible to prevent an unexpected problem from arising even if a sudden power interruption or the like occurs.

While the embodiments of the present invention have been described, the present invention is not limited only to the examples of the embodiments described above and can be carried out in various ways by being changed or modified as appropriate.

For example, in the above-described embodiments, the machine learning device 300 creates a learning model by supervised learning; however, the machine learning device 300 can also create a learning model by unsupervised learning. This is made possible by for example, inputting the content (the presence or absence of the occurrence of a failure) of the failure notification as one of the state variables S.

Moreover, the above-described embodiments are based on the premise that learning, prediction, and retracting processing by the predicting device 100, the machine learning device 300, and the control device 200 are completed by the time at which a power-supply failure is predicted to occur. However as a measure of precaution, an uninterruptible power supply system that can back up the operations of the predicting device 100, the machine learning device 300, and the control device 200 for at least a given length of time may be introduced. This makes it possible to continue learning, prediction, and retracting processing even if an unpredictable power-supply failure occurs.

While the embodiments of the present invention have been described, the present invention is not limited to the examples of the embodiments described above and can be carried out in other ways by being changed or modified as appropriate.

The invention claimed is:

1. A predicting device for predicting that power will become unstable, corresponding to a condition where power failure or voltage drop is apt to occur, the predicting device comprising:
   a machine learning device configured to learn a relationship between a change in measurement data indicating a state of a power supply and a failure which occurs in the power supply, wherein the machine learning device includes a processor configured to
      observe the measurement data including at least a measurement value of electric power consumption in a factory as a state variable indicating a current state of an environment,
      acquire, as judgment data, a failure notification indicating an occurrence of the failure,
      learn the relationship between the change in the measurement data and the failure by correlating the change in the measurement data with the failure notification by using the state variable and the judgment data, and output a failure prediction notification to control a working machine to execute a retracting operation of the working machine to transition the working machine to a safely retracted state, wherein the working machine is a machine tool or a robot.

2. The predicting device according to claim 1, wherein the processor is configured to perform, using the state variable and the judgment data, calculation of a multi-layer structure.

3. The predicting device according to claim 1, wherein the processor is configured to
predict the occurrence of the failure in accordance with the measurement data based on a learning result, and
in response to predicting the occurrence of the failure, output the failure prediction notification.

4. The predicting device according to claim 1, wherein the machine learning device is placed in cloud, fog, and edge computing environments.

5. The predicting device according to claim 1, wherein the failure notification includes a notification signal output in response to a voltage dropping below a predetermined threshold value, and
the processor is configured to, in response to acquiring the failure notification, learn the relationship between the change in the measurement data and the failure by correlating the change in the measurement data with the failure notification by using the state variable and the judgement data.

6. The predicting device according to claim 1, wherein in the retracting operation, the working machine is moved away from a workpiece being worked on by the working machine.

7. The predicting device according to claim 1, wherein the processor is configured to predict a time that elapses before the occurrence of the failure in accordance with the measurement data based on a learning result.

8. A machine learning device for learning a relationship between a change in measurement data indicating a state of a power supply and a failure which occurs in the power supply, the machine learning device comprising:
a processor configured to
observe the measurement data including at least a measurement value of electric power consumption in a factory as a state variable indicating a current state of an environment,
acquire, as judgment data, a failure notification indicating an occurrence of the failure,
learn the relationship between the change in the measurement data and the failure by correlating the change in the measurement data with the failure notification by using the state variable and the judgment data, and
output a failure prediction notification to control a working machine to execute a retracting operation of the working machine to transition the working machine to a safely retracted state, wherein the working machine is a machine tool or a robot.

9. The machine learning device according to claim 8, wherein
the failure notification includes a notification signal output in response to a voltage dropping below a predetermined threshold value, and
the processor is configured to, in response to acquiring the failure notification, learn the relationship between the change in the measurement data and the failure by correlating the change in the measurement data with the failure notification by using the state variable and the judgement data.

10. The machine learning device according to claim 8, wherein in the retracting operation, the working machine is moved away from a workpiece being worked on by the working machine.

11. The machine learning device according to claim 8, wherein the processor is configured to predict a time that elapses before the occurrence of the failure in accordance with the measurement data based on a learning result.

12. A production system, comprising:
a predicting device configured to predict that power will become unstable, corresponding to a condition where power failure or voltage drop is apt to occur; and
a control device configured to control a working machine, wherein
the predicting device includes a machine learning device configured to learn a relationship between a change in measurement data indicating a state of a power supply and a failure which occurs in the power supply,
the machine learning device includes a processor configured to
observe the measurement data including at least a measurement value of electric power consumption in a factory as a state variable indicating a current state of an environment,
acquire, as judgment data, a failure notification indicating an occurrence of the failure, and
learn the relationship between the change in the measurement data and the failure by correlating the change in the measurement data with the failure notification by using the state variable and the judgment data, and
the control device includes a processor configured to
receive a failure prediction notification of the failure which occurs in the power supply, the failure being predicted based on the change in the measurement data indicating the state of the power supply, and
cause a transition of the working machine to a safely retracted state in response to receiving the failure prediction notification, wherein
the working machine is a machine tool or a robot.

13. The production system according to claim 12, wherein the control device is configured to cause the transition of the working machine to the safely retracted state based on a predetermined program.

14. The production system according to claim 12, further comprising:
an uninterruptible power supply system configured to back up an operation of the machine learning device.

15. The production system according to claim 12, wherein
the failure notification includes a notification signal output in response to a voltage dropping below a predetermined threshold value, and
the processor of the machine learning device is configured to, in response to acquiring the failure notification, learn the relationship between the change in the measurement data and the failure by correlating the change in the measurement data with the failure notification by using the state variable and the judgement data.

16. The production system according to claim 12, wherein in the transition of the working machine to the safely retracted state, the working machine is moved away from a workpiece being worked on by the working machine.

17. The production system according to claim 12, wherein the processor is configured to predict a time that elapses before the occurrence of the failure in accordance with the measurement data based on a learning result.

\* \* \* \* \*